Nov. 29, 1927.
T. H. STRACHAN
1,650,913
SPRING SCALE
Filed Aug. 1, 1925
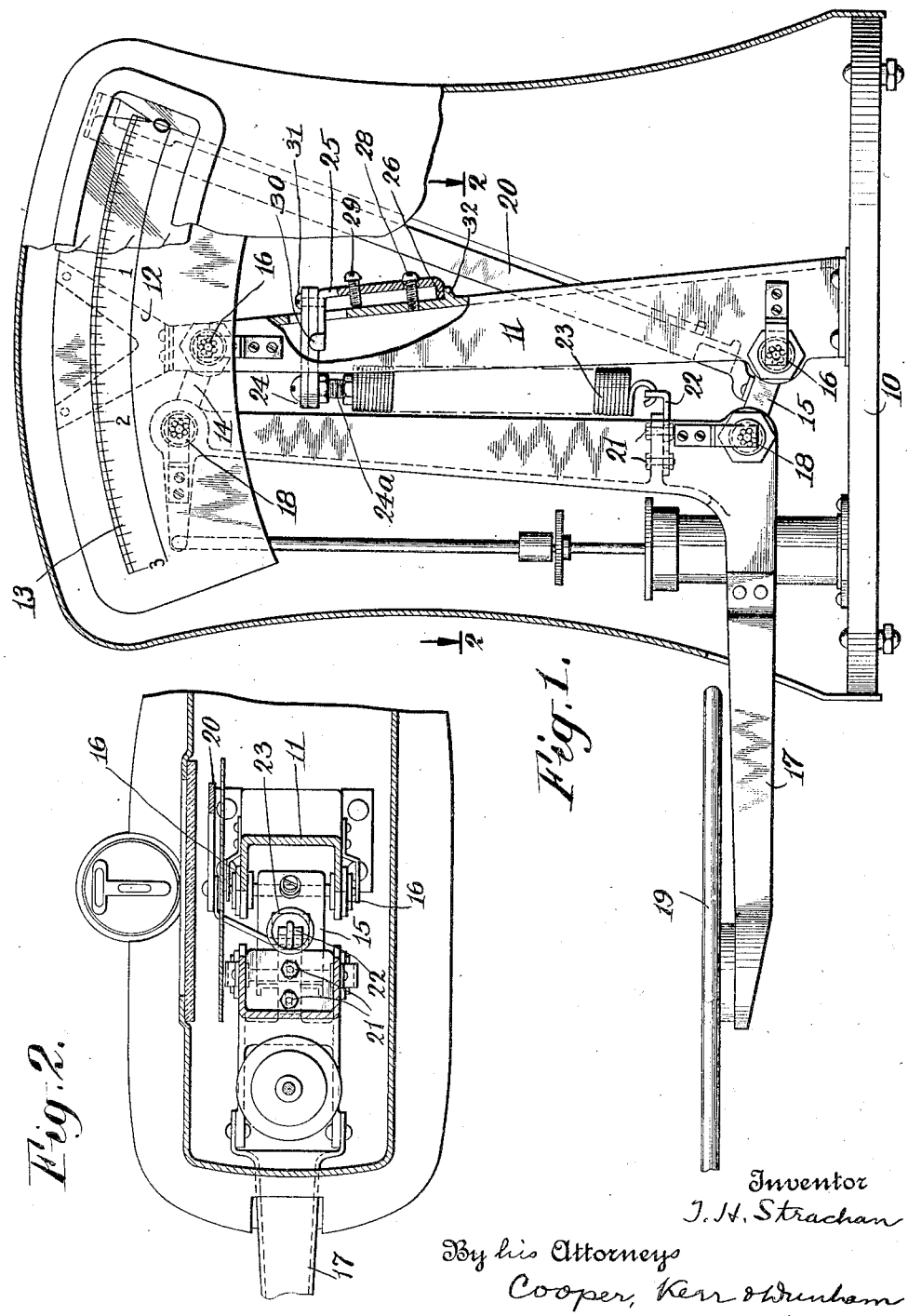
Inventor
T. H. Strachan
By his Attorneys
Cooper, Kerr & Dunham Patented Nov. 29, 1927.

1,650,913

UNITED STATES PATENT OFFICE.

THOMAS H. STRACHAN, OF DAYTON, OHIO, ASSIGNOR TO DAYTON SCALE COMPANY, OF DAYTON, OHIO, A CORPORATION OF NEW JERSEY.

SPRING SCALE.

Application filed August 1, 1925. Serial No. 47,475.

This invention relates to improvements in weighing scales and more particularly to improvements in the scale shown and described in the application of Robert Craig, Serial No. 668,076, filed October 12, 1923.

The objects of the present invention reside in the provision of a scale of the spring type which will be compact and simple and inexpensive to manufacture and assemble. Provision is made for compensating for thermal errors or changes in the resilient load counterbalancing mechanism in a simple manner.

In the drawings,

Fig. 1 shows an elevational view of a scale incorporating my invention.

Fig. 2 shows a detail sectional view taken on line 2—2 of Fig. 1.

In more detail the scale comprises a base 10 having a suitable channel shaped standard 11 supported thereon and extending upwardly therefrom and carrying at its upper end a bracket 12 supporting a chart 13 of any desired form. A pair of check links 14 and 15 are suitably pivotally supported upon the base. Preferably ball bearings 16 are provided for this purpose. The platform supporting member is substantially L-shaped and is designated 17. This member is interconnected to the ends of the check links, suitable ball bearings being preferably provided as shown at 18. The platform 19 may be of any desired form and may be rigidly supported upon member 17. A pivotal indicator 20 is fast to the lower check 15 and is provided with an index or pointer to traverse chart 13. Adjustably secured to member 17 by bolts 21 is a spring fastening plate 22 to which the load counterbalancing or load offsetting spring 23 is connected. The upper end of the load offsetting spring is connected to a thermostatic bi-metallic bar 24 in any suitable manner as by the stud 24ª. The thermostat 24 is preferably supported upon a sheet metal bracket plate 25 which bracket is provided with a toe portion 26 to bear against standard 11 over shoulder 32 thereon. Screws 28 are threaded into the standard and fit loosely through holes in the bracket. Other screws 29 are threaded in the bracket and bear against the standard 11. By loosening screws 28 and advancing screws 29 the thermostat may be raised to secure a proper zero adjustment. To lower the thermostat the operation is effected in reverse manner, i. e. by tightening screws 28 and loosening screws 29. The bracket 25 preferably has tab portions 30 struck up therefrom to guide the thermostatic bar at its sides. The bar itself is secured to the bracket by a stud 31.

The operation of the scale will be readily understood as when a load is placed upon the platform the part 17 descends distending spring 23 and causing the indicator 20 to move transversely in an amount proportional to the applied load. By adjusting plate 22 in or out the relative point of attachment of the lower end of the spring 23 with respect to the structure 17 may be varied. In this way the spring can be attached at a greater or less distance from the pivot center of bearings 16 and 18. Inasmuch as part 17 has an outward swinging movement the result of this adjustment will be to vary the resistance to movement of the part 17 in accordance with the said adjustment. The thermostat 24 is adapted to compensate for variation in the length of the spring 23.

I claim—

1. A weighing scale comprising a standard, a pair of check links supported thereon, and in turn supporting a load support, a thermostatic bar supported by said standard, a load counterbalancing spring connected to said load support and to said thermostatic bar, and means for adjusting the position of the thermostatic bar to provide for zero adjustment of the scale.

2. A weighing scale comprising a standard, a pair of check links supported thereon, a load support carried by said links, a thermostatic bar attached to said standard, a load counterbalancing mechanism interconnecting said load support and said thermostatic bar and means for adjusting the position of the thermostatic bar relatively to the supporting standard to provide for zero adjustment of the scale.

3. A weighing scale comprising a standard, a pair of check links supported thereon, a load support carried by said links, a thermostatic bar supported by said standard, a load counterbalancing spring interconnecting said load support and said bar and entirely supported by said bar and means for varying the position of said bar to provide for zero adjustment of the scale.

4. A weighing scale comprising a standard and a load support carried thereby, a thermostatic member comprising a pair of metallic bars having different co-efficients of expansion, a supporting member therefor and means for pivotally mounting said member to said standard whereby the position of said thermostatic member may be varied, and a spring interconnecting said thermostatic member and said load support.

5. A weighing scale comprising a standard, a pair of links connected thereto, a load support attached to said links, a thermostatic member comprising a pair of metallic bars rigidly connected together, said bars having different co-efficients of expansion, means for pivotally attaching said bars to said standard comprising a supporting plate and screw means passing through said plate and cooperating with said standard, and a load offsetting device interconnecting said load support and said thermostatic member.

6. In a weighing scale having a load offsetting spring and an adjustable supporting means for said spring comprising a plate-like member and a support therefor, said plate-like member having a plurality of co-operating screws adapted to conjointly co-operate with said plate and with the support therefor, one of said screws being threadedly connected with said support and freely passable through said plate and another of said screws being threadedly connected with said plate and adapted to abut said support, said screws being jointly operable for providing a single relative adjustment between the plate and the support.

In testimony whereof I hereto affix my signature.

THOMAS H. STRACHAN.